United States Patent
Beale (10) Patent No.: US 8,972,964 B2
(45) Date of Patent: Mar. 3, 2015

(54) DYNAMIC FIRMWARE UPDATING SYSTEM FOR USE IN TRANSLATED COMPUTING ENVIRONMENTS

(75) Inventor: Andrew Ward Beale, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 296 days.

(21) Appl. No.: 13/558,573

(22) Filed: Jul. 26, 2012

(65) Prior Publication Data

US 2014/0033187 A1 Jan. 30, 2014

(51) Int. Cl.
*G06F 9/44* (2006.01)
*G06F 9/445* (2006.01)

(52) U.S. Cl.
CPC . *G06F 8/67* (2013.01); *G06F 8/665* (2013.01)
USPC .......................................................... 717/168

(58) Field of Classification Search
CPC ............... G06F 8/61; G06F 8/63; G06F 8/65; G06F 8/66; G06F 8/665; G06F 8/67; G06F 8/68
USPC ................................................ 717/168–178
See application file for complete search history.

(56) References Cited

U.S. PATENT DOCUMENTS

| | | | |
|---|---|---|---|
| 5,680,645 A * | 10/1997 | Russell et al. ................... 710/48 |
| 6,629,315 B1 * | 9/2003 | Naylor ........................... 717/168 |
| 6,675,258 B1 * | 1/2004 | Bramhall et al. .............. 711/114 |
| 7,343,515 B1 * | 3/2008 | Gilbertson et al. .............. 714/10 |
| 8,438,315 B1 * | 5/2013 | Tao et al. ........................... 710/8 |
| 8,745,614 B2 * | 6/2014 | Banerjee et al. ............... 717/173 |
| 2004/0255286 A1 * | 12/2004 | Rothman et al. ............... 717/168 |
| 2006/0075076 A1 * | 4/2006 | Sinha ............................ 709/220 |
| 2007/0234332 A1 * | 10/2007 | Brundridge et al. .......... 717/168 |
| 2008/0244552 A1 * | 10/2008 | Toeroe ........................... 717/168 |
| 2010/0042869 A1 * | 2/2010 | Szabo et al. ....................... 714/4 |
| 2010/0162226 A1 * | 6/2010 | Borissov et al. ............... 717/173 |
| 2010/0199272 A1 * | 8/2010 | Mahajan et al. ............... 717/171 |
| 2011/0289417 A1 * | 11/2011 | Schaefer et al. ............... 715/735 |
| 2011/0321027 A1 * | 12/2011 | Andrews et al. ............... 717/169 |
| 2013/0031538 A1 * | 1/2013 | Skalsky ......................... 717/168 |
| 2013/0086571 A1 * | 4/2013 | Dasari et al. .................. 717/168 |

* cited by examiner

*Primary Examiner* — Qing Chen
*Assistant Examiner* — Andrew M Lyons
(74) *Attorney, Agent, or Firm* — James E. Goepel (57) ABSTRACT

Systems and methods for updating firmware executing on a computing system are disclosed. One method includes building an initial stack for use by an updated firmware module, and quiescing I/O operations occurring on the computing system. The method also includes halting all but a remaining firmware module from among one or more firmware modules to be updated and that are executing on the computing system, and, with the remaining firmware module executing on the computing system, indicating to perform a firmware update. The method further includes halting execution of a partition including the remaining firmware module. The method also includes updating the remaining firmware module executing on the computing system with the updated firmware module, and initiating execution of the updated firmware module using the initial stack.

22 Claims, 8 Drawing Sheets

DYNAMIC FIRMWARE UPDATING SYSTEM FOR USE IN TRANSLATED COMPUTING ENVIRONMENTS

TECHNICAL FIELD

The present application relates generally to firmware updates in a computing system. In particular, the present application relates to dynamic firmware updating systems useable in translated computing environments.

BACKGROUND

In computing systems, firmware generally executes natively on hardware to internally control various electronic devices. In contrast to higher level software which could be changed without replacing a computer hardware component, firmware is typically involved with very basic low-level operations, without which a device would be non-functional. In other words, firmware is generally used to track and control native hardware operations, and to otherwise provide the interface between that hardware and other, higher level software systems.

Occasionally, it is necessary to update firmware that is executing on a computing system. Doing so usually involves loading a binary image file of the new firmware, provided by the manufacturer, into the device, according to a specific procedure. Typically, this involves overwriting existing firmware in a flash memory or other persistent memory, and restarting the computing system to cause the new firmware to effectively "take control" of the target hardware resource. This is because firmware operates directly on computing hardware resources, and it can be the state of those hardware resources is not communicated from the firmware to be replaced to the new, replacement firmware.

This general firmware replacement process has drawbacks, in particular in large-scale or server computing environments. For example, in rack server or mainframe systems, it may take a long time to restart the computing system once the firmware is updated. For example, a complete reboot process on a mainframe system may require minutes, or more likely tens of minutes, before the system can shut down, restart, and reload each of the workloads that were executing on the system at the time of the restart. Furthermore, aside from the delay in restarting the workload, the system state at the time of the restart is not preserved, so some portion of a workload may need to be reexecuted or risk being lost or unexecuted. For critical workloads, it may be important that the workload not be interrupted, or at least not be interrupted for a long period of time.

For these and other reasons, improvements are desirable.

SUMMARY

In accordance with the following disclosure, the above and other issues are addressed by the following:

In a first aspect, a method for updating firmware executing on a computing system are disclosed. The method includes building an initial stack for use by an updated firmware module, and quiescing I/O operations occurring on the computing system. The method also includes suspending execution of a workload on all but a remaining firmware module from among one or more firmware modules to be updated and that are executing on the computing system, and, with the remaining firmware module executing on the computing system, indicating to perform a firmware update. The method further includes halting execution of a partition including the remaining firmware module. The method also includes updating the remaining firmware module executing on the computing system with the updated firmware module, and initiating execution of the updated firmware module using the initial stack.

In a second aspect, a computing system is disclosed that includes an initial firmware module associated with a partition of the computing system and configured to parse and execute non-native code stored in a partition of the computing system natively on the computing system, thereby performing one or more workloads. The computing system also includes a console program communicatively connected to the initial firmware module by a communication link, the console program having available an updated firmware module. The computing system includes a non-native operating system executing on the computing system via the initial firmware module and including instructions configured to query the console program to determine availability of the updated firmware module and build an initial stack for use by the updated firmware module. The console program is configured to, upon request, update the initial firmware module with the updated firmware module. The updated firmware module initiates execution from the initial stack, and execution of the initial firmware module is terminated. Execution of the one or more workloads is resumed on the updated firmware module.

In a third aspect, a method for updating one or more central processing modules executing on a computing system is disclosed. The method includes determining the existence of an updated central processing module available for operation on a computing system executing one or more initial central processing modules, each of the initial central processing modules and the updated central processing module configured to parse and execute non-native code stored in a memory of the computing system natively on the computing system. The method further includes building an initial stack for use by the updated central processing module, and quiescing I/O operations on the computing system. The method also includes halting all but a remaining central processing module from among the one or more central processing modules that are executing on the computing system, and, with the remaining central processing module executing on the computing system, indicating to a console program to perform an update. The method also includes halting execution of the remaining central processing module while maintaining the non-native code in the memory. The method includes switching the remaining central processing module executing on the computing system with the updated central processing module, and initiating execution of the updated central processing module using the initial stack. The method further includes resuming execution of the workload using the updated firmware module. The computing system is not required to be rebooted during updating of the central processing modules.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for dynamically updating firmware executing on a computing system. The methods and systems described herein are particularly adapted to provide a more efficient arrangement for updating firmware, and in particular avoiding the requirement of restarting/rebooting the computing system on which the firmware executes. This improves performance of such systems, and allows system administrators to more easily update firmware of systems during periods where workload throughput demands may be reduced, but where a complete system restart may otherwise be unadvisable.

Figure 1:
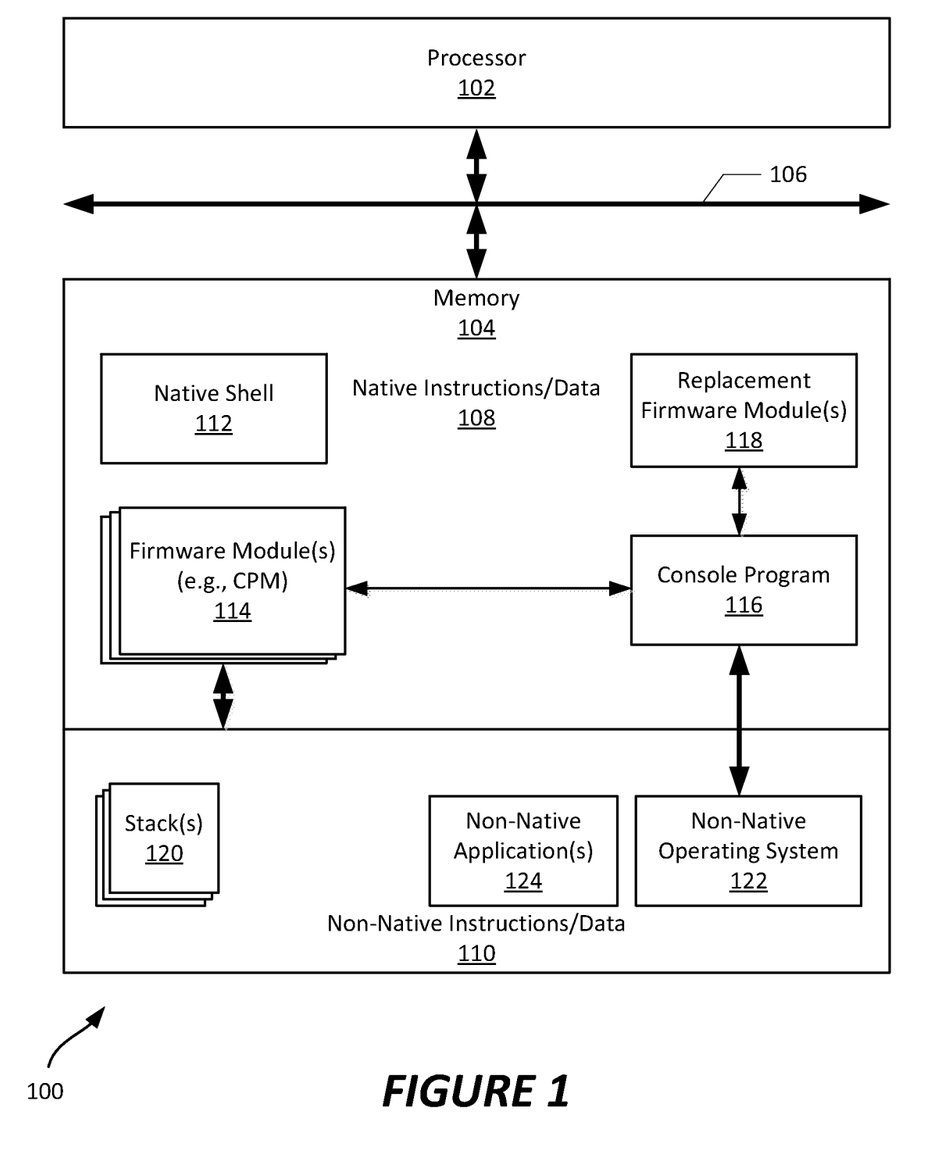
FIG. 1 is a logical block diagram of a computing system in which aspects of the dynamic firmware update systems of the present disclosure can be implemented.

Referring to FIG. 1, a logical block diagram of a computing system 100 is shown in which aspects of the dynamic firmware update systems of the present disclosure can be implemented. The computing system 100 can include any of a variety of types of computing system hardware and/or software components; an example system useable as computing system 100 is described below in connection with FIG. 8.

As recognized and explained in further detail herein, the computing system 100 can include a set of resources capable of being assigned to one or more partitions. As discussed herein, a partition of the computing system 100 refers to a collection of resources useable to instantiate an operating environment.

In the embodiment shown, the computing system 100 includes a processor 102 communicatively connected to a memory 104 via system bus 106. The processor 102 can be any of a variety of types of processors, selected to execute instructions written for a particular instruction set architecture. In some embodiments, the processor 102 uses an Intel-based (e.g., x86, x86-64, IA64, etc.) instruction set architecture as its native instruction set architecture. However, in various embodiments, other instruction set architectures (e.g., ARM, MIPS, PowerPC, SPARC, etc.) could be used as well.

The memory 104 can include one or more memory devices, and generally represents a storage subsystem of the computing device. The memory 104 can include one or more different types of RAM, Flash memory, or disk memory, and is addressable by the processor 102 to execute one or more of the modules thereon. As further discussed below, the memory 104 is capable of hosting different firmware and/or software systems. In an example embodiment discussed herein, the memory 104 stores non-native instructions associated with one or more particular partitions that can be translated and natively executed by firmware; that firmware can be updated in realtime using features of the present disclosure, and execution of that non-native code in memory can be resumed quickly, without affecting the state of the memory 104 and without requiring restart of the overall computing system 100.

The system bus 106 can be used to connect the processor 102 and memory 104 to a variety of other computing subsystems, such as I/O device controllers or I/O devices, graphics subsystems, or other computing components. In some embodiments, the system bus 106 provides a connection to networking components as well. An example of a computing system including a variety of possible devices is described below in connection with FIG. 8.

In various embodiments, the memory 104 can be maintained such that it includes areas of native instructions and data, as well as areas storing non-native instructions and data. In the embodiment shown, the memory 104 is separated into a native area 108 and a non-native area 110. The native area is configured to be addressable by the processor 102 using the native instruction set architecture of the computing system, while the non-native area 110 contains data organized according to some alternative alignment. In certain embodiments, the non-native area 110 can be addressable by the processor 102, but generally includes instructions and data that is not written to be recognized by that processor 102. In one example embodiment, the non-native area stores instructions and data organized according to a Unisys Clearpath/MCP system architecture, from Unisys Corporation of Blue Bell, Pa.

In the embodiment shown, the native area 108 includes a native shell 112, as well as one or more firmware modules 114. The native shell 112 can be any of a number of programs natively executed by the processor 102, such as a shell operating system (e.g., Linux, UNIX, etc.). The firmware modules 114 correspond to interface software modules that are natively executable by the processor, and which execute directly on the processor 102. In other words, the firmware modules 114 provide an interface to hardware that maintains a state of that hardware, and which would traditionally require the computing system 100 to be restarted in the event of an update of that firmware.

In some example embodiments, the firmware modules 114 include one or more central processor modules configured to interface with the non-native partition 110. In such embodiments, the firmware modules 114 are configured to parse and translate instructions and data in the non-native partition for native execution on the processor 102. It is noted that, in these example embodiments, the modules 114 correspond to firmware in that only those executing modules have access to and can track a current state of memory in the non-native partition. In other words, the processor 102, and native shell 112, cannot natively access and recognize the instructions and/or data stored in the non-native partition, due to its organization according to a non-native instruction set architecture. In particular, in embodiments of the present disclosure in which the non-native area 110 stores instructions and data organized according to a Unisys Clearpath/MCP system architecture, the firmware modules 114 are configured to emulate processors configured to execute instructions according to that instruction set architecture, for example by parsing those instructions and associated data, and executing corresponding instructions in the native instruction set which provide equivalent functionality. The results of such instructions are then stored back in the non-native area 110 by the firmware modules 114, using the non-native instruction and data format(s). In other words, in the context of the present disclosure, code written for execution on a Unisys Clearpath/MCP system software can be translated by the firmware 114 for execution using native instructions of the Intel-based instruction set architecture.

In particular, in the embodiment shown, the non-native area 110 includes memory containing instructions and data organized according to a non-native instruction set architecture. In the embodiment shown, a stack-based instruction set architecture is illustrated, including a plurality of stacks 120 from which workloads can be executed by the various firmware modules 114. In the embodiment shown, the non-native partition 110 also includes a non-native operating system 122, which can execute on one or more if the firmware modules 114, as well as one or more non-native applications 124. The non-native applications can be managed by the non-native operating system 122, which views the firmware modules as native processors, analogous to the relationship between shell 112 and processor 102. The non-native operating system 122 therefore can execute on and schedule execution of the non-native applications 124 on the various firmware modules 114, which are currently active and executing on the computing system via processor 102. As such, when a non-native application 124 is scheduled for execution by the non-native operating system for execution on a particular firmware module 114, it is placed in a corresponding stack 120 (e.g., via ready queues or other analogous scheduling process present in the non-native architecture being emulated by the firmware modules 114).

In the embodiment shown, the native partition 108 also includes a console program 116, which executes concurrently with the firmware on the computing system 100 and is capable of communicating with the firmware modules 114, and managing use of the firmware modules. For example, in some embodiments, the console program 116 can monitor the availability of firmware modules, such as those firmware modules 114 which are executing based on instructions and data in the non-native area 110, and can also manage and/or monitor other firmware modules that may be available for use. For example, as shown the console program is interfaced to the central processing modules 114, as well as a replacement firmware module 118. The replacement firmware module 118 can represent, for example, a corresponding updated firmware module. In the embodiment shown, the replacement firmware module 118 corresponds to a new version of a central processing module that can be used in replacement for the existing, executing central processing modules. As discussed in further detail below, the methods and systems disclosed herein allow for replacement of one or more of the firmware modules 114 with the replacement firmware module 118 without losing a state of hardware that is otherwise tracked only by that preexisting firmware.

In the embodiment shown, the console program 116 can be communicatively connected to the non-native operating system 122. In such embodiments, the non-native operating system 122 can inquire into the status of both the central processing module firmware on which it operates, as well as inquiring into the availability of the replacement firmware 118 (if applicable). Additionally, from the perspective of the console program 116, that program can be used by a user of the computing system 100 to view (and optionally affect) operation of the non-native, "emulated" computing system executing thereon, via the firmware 114 and data/instructions within the non-native area 110.

Referring generally to FIG. 1, it is noted that although the computing system 100 as illustrated represents a system in which the firmware is configured to execute non-native instructions on a native processing unit, other arrangements are possible as well in which the firmware is configured to interface with other hardware or software components, such as peripheral devices, processing units, or other systems.

Figure 2:
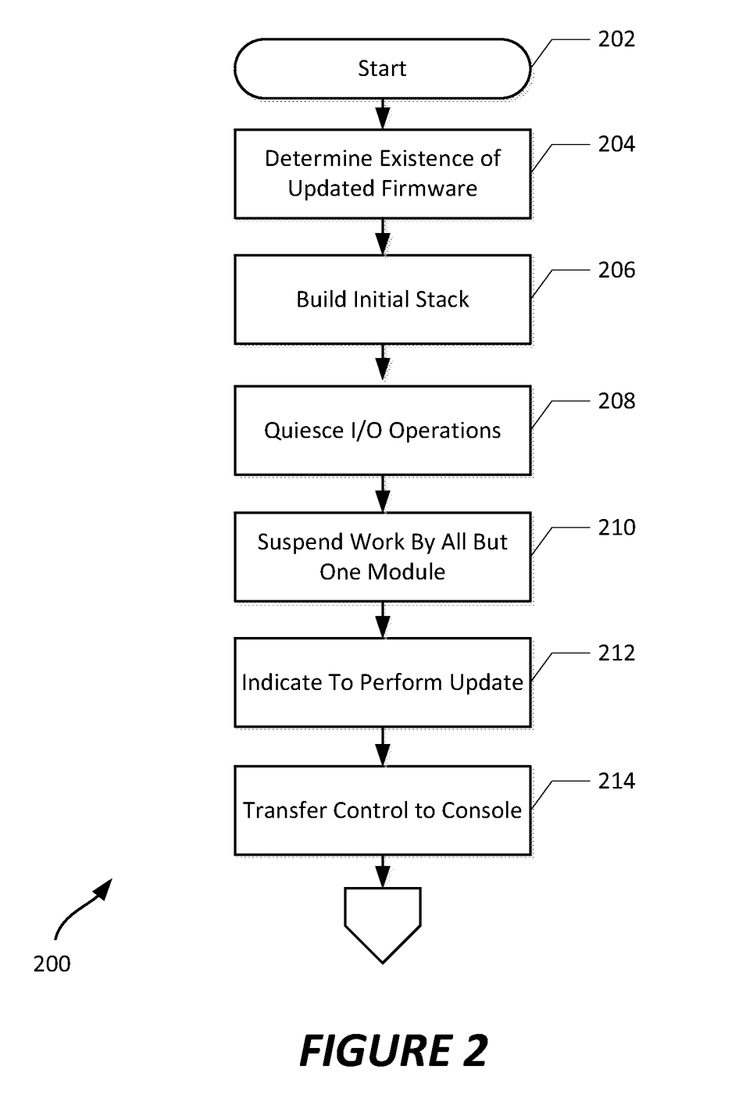
FIG. 2 is a flowchart illustrating a portion of a method for dynamically updating firmware executing on a computing system according to an example embodiment of the present disclosure.
Figure 3:
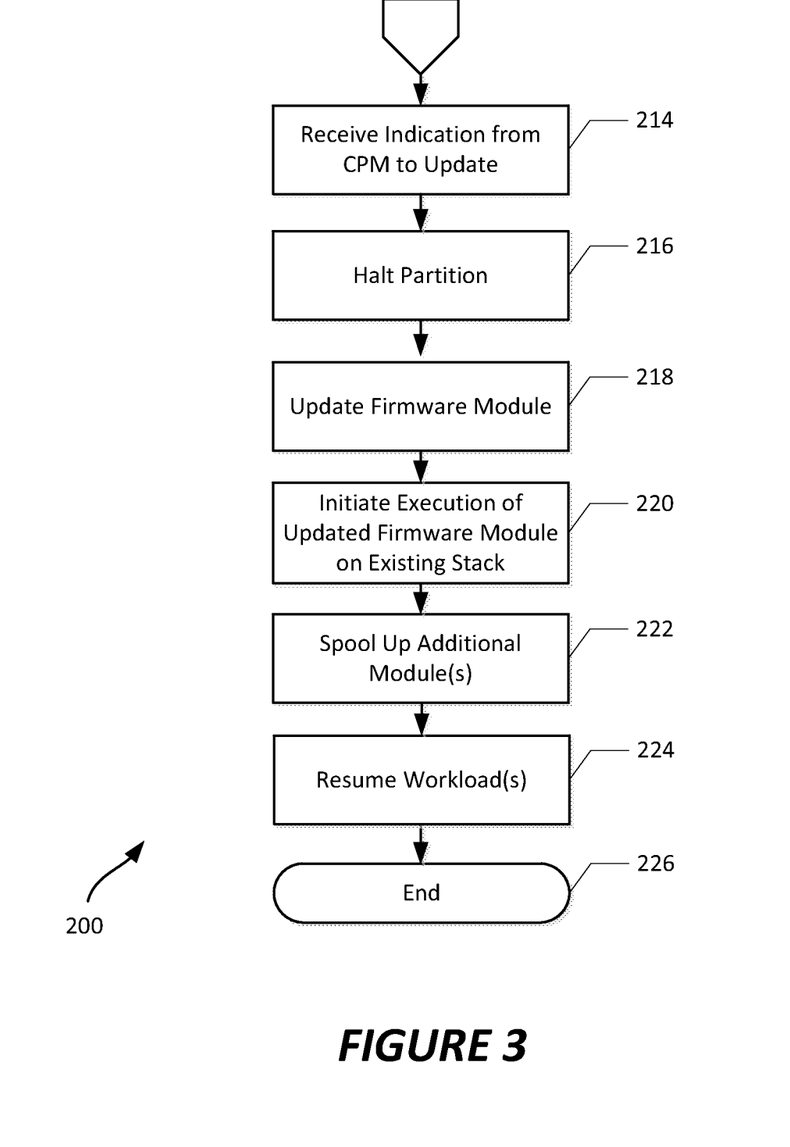
FIG. 3 is a flowchart illustrating a further portion of a method for dynamically updating firmware executing on a computing system, according to the embodiment of FIG. 2.

Referring now to FIGS. 2-3, methods for realtime updating of firmware are disclosed, in which restarting a computing system can be avoided and in which resumption of workloads executing on that computing system can be expedited. The methods described in FIGS. 2-3 can be performed on a variety of computing systems having firmware installed thereon, but in the context of the present disclosure are discussed in terms of the computing system described above in connection with FIG. 1. The methods described herein can be performed, for example, in a variety of computing systems in which firmware is used, and provide certain advantages in circumstances where updating of firmware would typically require restarting of the computing system on which the firmware executes. In particular, the methods described herein provide advantages where the firmware is used to provide an underpinning for an emulated operating system, or other non-native workloads executed on a computing system such as described above.

As seen in FIG. 2, a method 200 for realtime updating of firmware is instantiated at a start operation 202. The start operation 202 can correspond, in various embodiments, to a scheduled command or user-directed indication to initiate a firmware update, if such update is available. In various embodiments, the start operation 202 corresponds to an indication to or at the non-native operating system, which generally triggers the method 200 of FIG. 2.

A firmware determination operation 204 generally determines whether firmware exists within the computing system to which the system can be upgraded. This can include, in the example context of FIG. 1, described above, the non-native operating system, such as system 122 of FIG. 1, inquiring of a console program 116 as to the existence of possible replacement firmware 118 for use in replacing one or more of the firmware modules 114 included in that system. Information requested from the console program 116 by the non-native operating system can include a request for identification of the current firmware, as well as an identification of one or more additional firmware levels relating to firmware that is available for use on the computing system.

In some embodiments, the firmware determination operation 204 also verifies, through a query to the console program 116 from the non-native operating system 122, that performing a dynamic firmware update is supported for the levels of firmware present in the computing system, and that the firmware update is not a "breakable" firmware update that would have the chance of causing errors in workloads executing on the computing system.

Upon a determination that updated firmware exists for use by a computing system in replacement for existing firmware (and that such an update is possible), an initial stack building operation 206 builds an initial stack for use by the replacement firmware. The initial stack generally represents an initial stack required for startup of a computing system according to a non-native architecture, such as the MCP/Clearpath architecture mentioned above. The initial stack building operation 206 further includes incorporation into the new initial stack one or more custom items used in the specific context discussed herein, in that it includes a set of instructions defining, for example, how to terminate other pending stacks that should not be persisted during restart of the non-native area, as well as one or more operations for updating the clock of the non-native operating system, due to a pause which occurs in the non-native operating system (as discussed in further detail below). Other instructions may be added to the custom initial stack, depending upon the desired set of operations to be performed on the computing system upon restart of the firmware.

In the embodiment discussed herein, the initial stack building operation 206 is performed by the non-native operating system, as executed on one or more of the firmware modules 114, as shown in FIG. 1. However, in systems where initial firmware operations are not stack-based, a custom set of initial processes can be stored in some other type of memory structure for passing to the updated firmware.

Once the custom initial stack is constructed by the non-native operating system, a quiesce operation 208 quiets any I/O operations on the computing system in which the firmware update is to take place. In the context of the emulated non-native system illustrated in FIG. 1, this can include any I/O operations that are performed on the emulated non-native system managed by the non-native operating system. In some embodiments, it may also include quiescing all I/O operations that are performed anywhere within the computing system, to prevent the risk that such I/O operations may result in alteration of one or more memory locations managed by the firmware to be replaced, during the actual replacement of the firmware with updated firmware.

A suspend operation 210 is then triggered by the non-native operating system, which results in suspension of all but one of the operating firmware modules on the computing system. In the context of the computing system of FIG. 1, this results in only one firmware module 114, or central processing module, executing the operating system on the computing system 100. In other embodiments, any set of multiple firmware modules associated with a single piece of hardware or interface are suspended, thereby isolating operation to a single firmware module. In an embodiment of the method 200 that executes within the computing system 100 of FIG. 1, this can occur, for example, by moving all but one existing firmware module executing as central processing modules to separate stacks, thereby halting their execution of workloads, and leaving one remaining executing stack operating from the current executable stack.

An update command operation 212 is then issued from the non-native operating system, via the remaining firmware module, to the console program to initiate the transition to new firmware. A transfer operation 214 transfers control of the overall method to the console program, for execution of the dynamic firmware update.

Referring now to FIG. 3, the method 200 continues with operation of the console program, being any of a variety of supervisory programs executing concurrently with the firmware on a computing system. The console program receives, at an update command receipt operation 214, the command from the non-native operating system to initiate the update of firmware on the computing system.

A halt partition operation 216 halts all operation on the resource managed by the firmware. In the embodiment shown in FIG. 1, the halt partition operation 216 halts operation of a particular partition, including the state of the stacks, non-native operating system, and non-native applications executing thereon, such that the partition resources (e.g., memory associated with that partition) are preserved in their last used state. As such, the halt partition operation 216, in conjunction with the quiesce operation 208 and halt operation 210, effectively captures a snapshot of the current state of execution within a particular partition by preventing the associated instructions and data from being changed during the firmware update process. In the embodiments discussed here, the halt partition operation 216 occurs on a partition including the remaining, executing firmware module.

An update operation 218 performs the actual updating of firmware within the computing system. Since the resource managed by the now-halted firmware has its state preserved, the current firmware can be replaced by updated firmware within the computing system. This can occur via any of a number of operations. In some embodiments, the current firmware is overwritten with new firmware. In other embodiments, and in particular in embodiments in which the firmware is not required to be stored in a particular location in memory, the update operation 218 can include a pair of renaming operations, which generally represent an efficient manner to define firmware as current or non-current firmware. For example, a current set of firmware, e.g., named "firmware.exe" could be renamed "firmware_old.exe"; new firmware, previously renamed "firmware_new.exe", could then be renamed "firmware.exe", taking place of the previously-named firmware. Alternative operations, such as a move operation, could be used as well, to similar effect. Regardless of the specific update operation performed, in general, the update operation is selected to minimize the time required to allow the updated firmware to take the place of the current firmware.

In the context of the computing system 100 of FIG. 1, the update operation 218 can be managed by the console program 116; however, alternative mechanisms could be used as well, for example through cooperative use of the native shell 112 or other native programs for updating and registering use of the updated firmware.

Following the update operation 218, an initiation operation 220 initiates operation of the newly-assigned active firmware. In the embodiment shown in FIG. 1, the update operation 218 starts execution of the new firmware using the customized, initial stack generated using the initial stack building operation 206, which involves both initial, startup operations generally performed by a system organized according stack-based non-native architecture, and the various custom operations included in the stack. This generally includes restarting use of the halted partition using the updated firmware, thereby allowing the operating system to resume operation from where the previous firmware left off, thereby restarting operation of the firmware within the partition.

In some embodiments, the custom initial stack generated using the initial stack building operation 206 includes instructions useable to terminate one or more stacks that were executing on one or more of the halted additional firmware instantiations. In such embodiments, the initiation operation can include, upon the new firmware module executing the custom initial stack, terminating other existing stacks still executing on the computing system 100, such that the same operations can be rescheduled for execution on the new firmware module or one or more other new firmware modules, which are initiated as discussed below.

Following the initiation operation 220, the new firmware can execute analogously to the preexisting firmware. This optionally includes a spooling operation 222, which involves spooling up one or more additional firmware modules to perform tasks included in a ready queue or otherwise scheduled for execution. In the example embodiment in which method 200 is implemented within the computing system 100 of FIG. 1, the spooling operation 222, involves creating one or more additional initial stacks for each corresponding initialized updated firmware instantiation. It additionally includes a workload resumption operation 224, in which the one or more applications 124 that were previously executing are resumed, thereby allowing continued execution from the point at which the previous firmware was interrupted to perform the firmware update.

An end operation 226 indicates completion of the dynamic firmware update, and results in continued operation of the computing system on which the firmware update takes place.

Referring to FIGS. 2-3 generally, it is noted that, in systems where method 200 is applicable to update one or more firmware modules, a number of advantages over traditional firmware updates are realized. For example, as new firmware becomes available that provides greater efficiency of improved functionality, that firmware can be utilized without requiring a complete restart of the computing system on which the firmware executes.

Furthermore, the method 200 can be, in some embodiments, performed over the course of a relatively short period of time, such that time between halting of operation of the existing firmware and updating/resuming operation of updated firmware is not so long that peripheral connections to the computing system performing the method are terminated. For example, in some embodiments in which the method 200 is performed on a system that updates central processing modules such as those illustrated in FIG. 1, the method 200 can be performed in about 7 seconds, as compared to about 30 seconds before an IP connection is typically terminated, and as compared to minutes or tens of minutes required to entirely restart a mainframe computing system.

Referring now to FIGS. 4-7, an example series of logical block diagrams are provided illustrating execution of a method for dynamically updating firmware on a computing system, such as using method 200 of FIGS. 2-3, within a computing environment that implements execution of an emulated, non-native system, such as the arrangement illustrated in FIG. 1.

Figure 4:
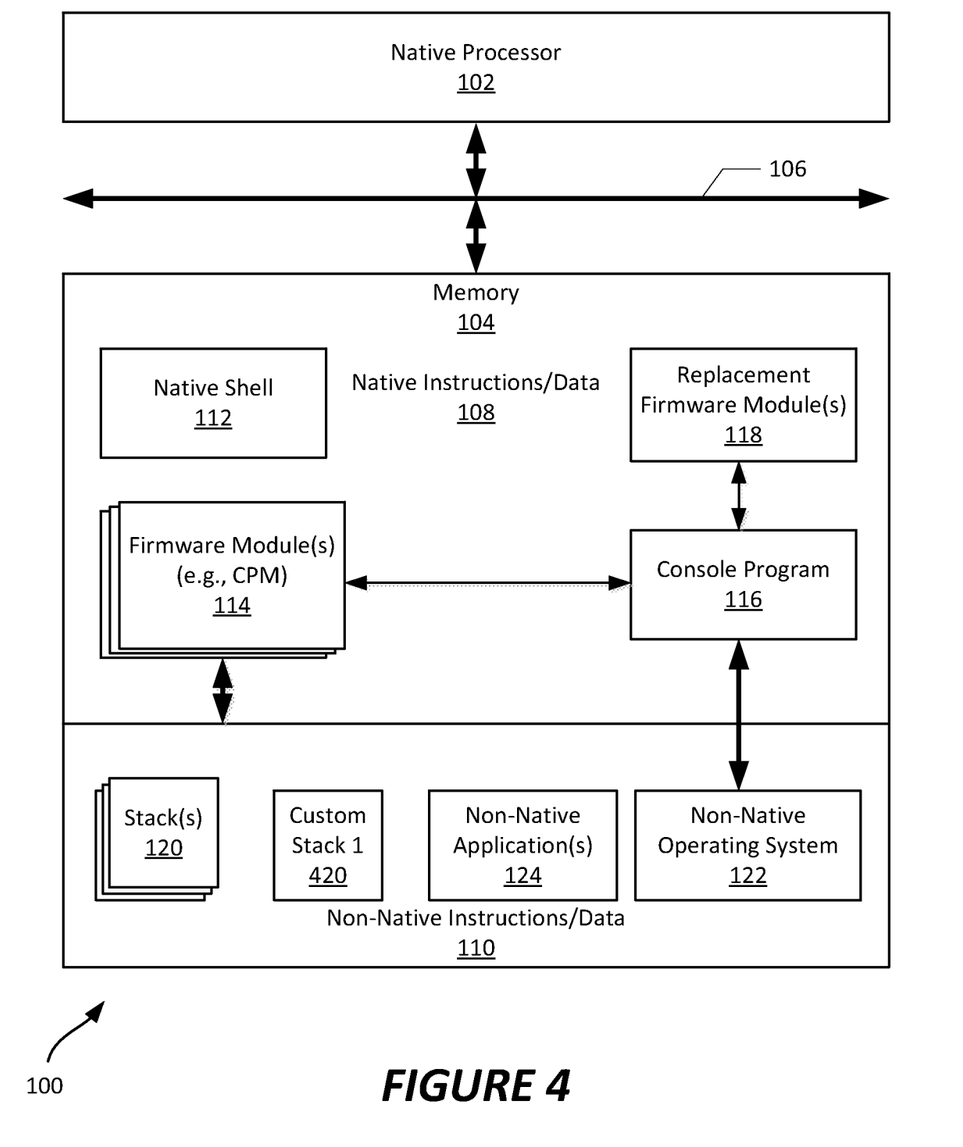
FIG. 4 is a logical block diagram of the computing system of FIG. 1, in which a dynamic firmware update has begun, according to a possible embodiment of the present disclosure.

FIG. 4 is a logical block diagram of the computing system 100 of FIG. 1, in which a dynamic firmware update has begun, according to a possible embodiment of the present disclosure. In the embodiment shown, the computing system 100 has determined that a replacement firmware module 118 is present and a realtime update of the firmware is possible (e.g., via the console program 116). As illustrated in this arrangement, the non-native operating system 122 has constructed a custom initial stack 420 useable with the replacement firmware when it is initialized. In other words, FIG. 4 illustrates a state of the computing system following operation of the firmware determination operation 204 and the initial stack building operation 206.

Figure 5:
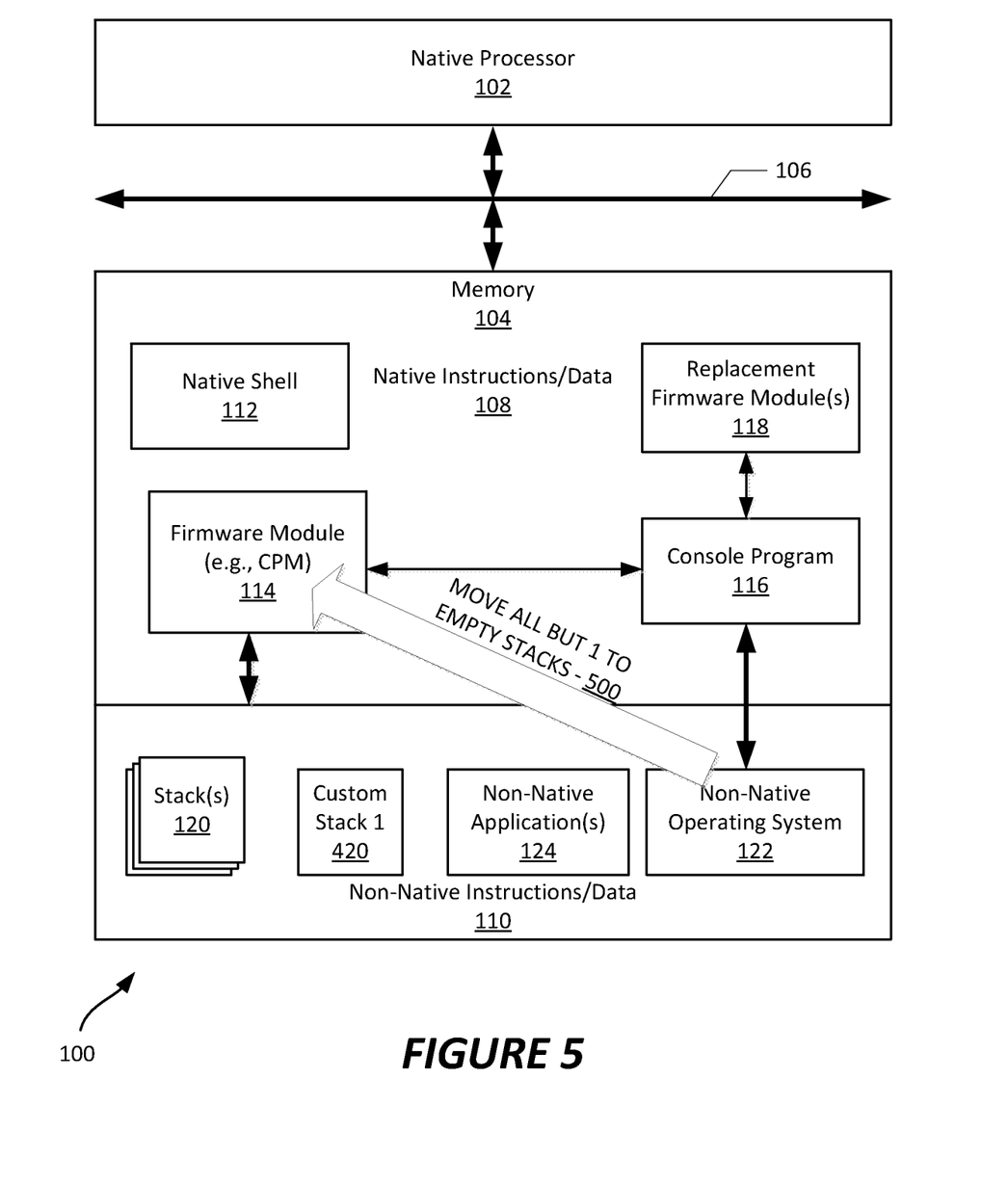
FIG. 5 is a logical block diagram of the computing system of FIG. 1, following the methods of FIGS. 2-3 to perform a dynamic firmware update, according to a possible embodiment of the present disclosure.

FIG. 5 is a logical block diagram of the computing system 100 of FIG. 1, in which a dynamic firmware update proceeds from the illustration in FIG. 4 to a point where execution of the operating system on the existing firmware is stopped. Specifically, the non-native operating system 122 causes each of the firmware modules 114 representing central processing modules, except for one remaining firmware module, to cause the operating system to stop changing state in the non-native environment on those firmware modules 114. This can be accomplished, for example, by associating each of these firmware modules with an "out-of-the-way" stack (seen as command 500). This stack keeps these firmware modules busy doing nothing (or at least nothing associated with relevant workloads, or which would cause a change of state of the system) until the partition is halted. The command 500 is, in some embodiments, issued directly to those central processing modules by operation of the non-native operating system, or can alternatively be issued to those modules via the console program 116. In other words, FIG. 5 illustrates a state of the computing system 100 following operation of the operation 210.

Figure 6:
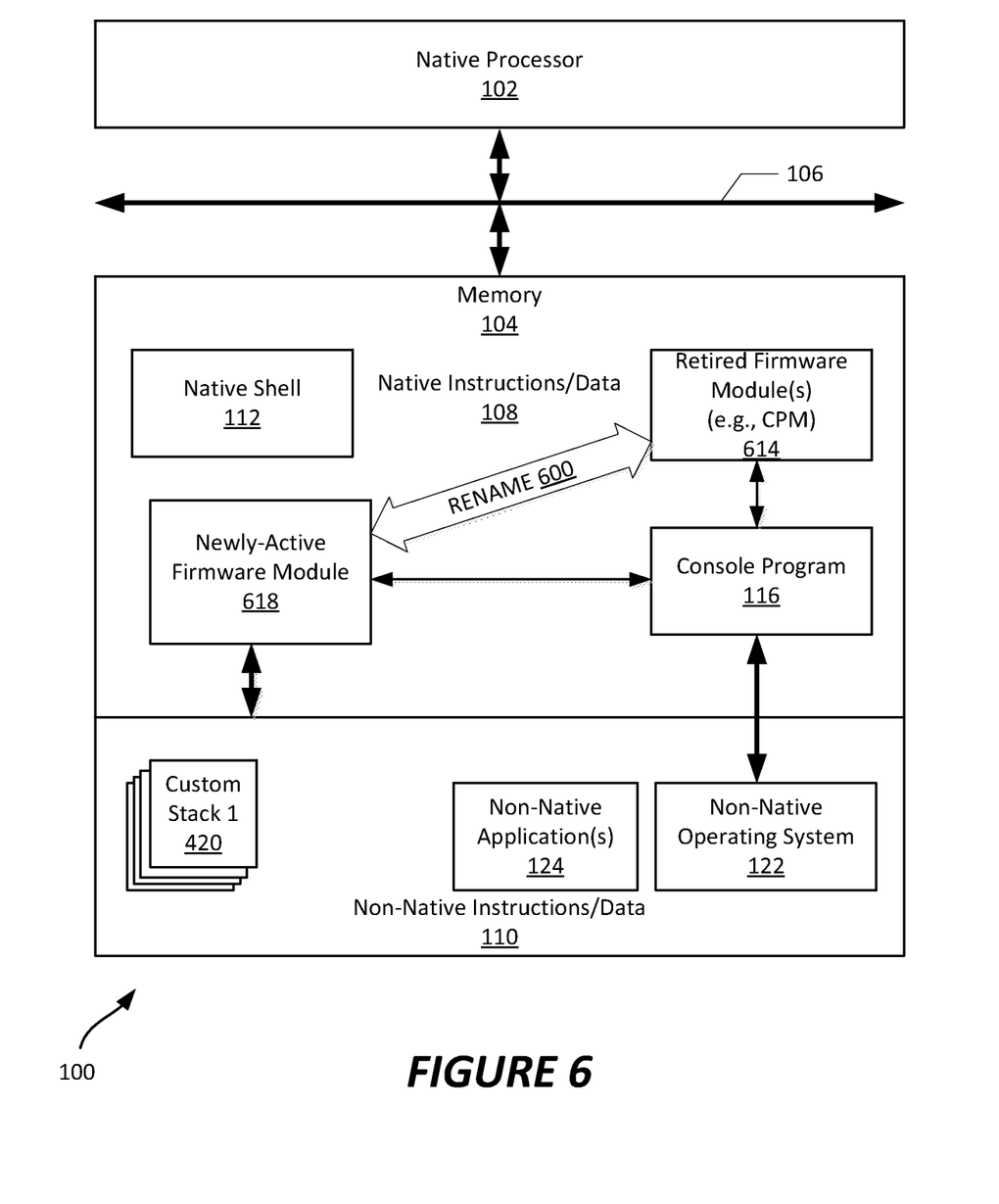
FIG. 6 is a logical block diagram of the computing system of FIG. 1 following the state of FIG. 5 during operation of the methods of FIGS. 2-3 to perform a dynamic firmware update, according to a possible embodiment of the present disclosure.

FIG. 6 is a logical block diagram of the computing system 100 of FIG. 1, in which a dynamic firmware update proceeds from the illustration in FIG. 4 to a point where a firmware update is to take place. As shown, a rename operation 600 halts and renames the previously existing firmware module 114 that remains executing on the computing system to be a previous firmware module 614, and renames the replacement firmware module to be a newly-active firmware module 618. It is noted that, as illustrated, instructions and data within the partition associated with the previous firmware module 614 remain intact, despite the fact that the firmware has been replaced. In other words, FIG. 6 illustrates a state of the computing system 100 following operation of the halt partition operation 216 and the update operation 218.

Figure 7:
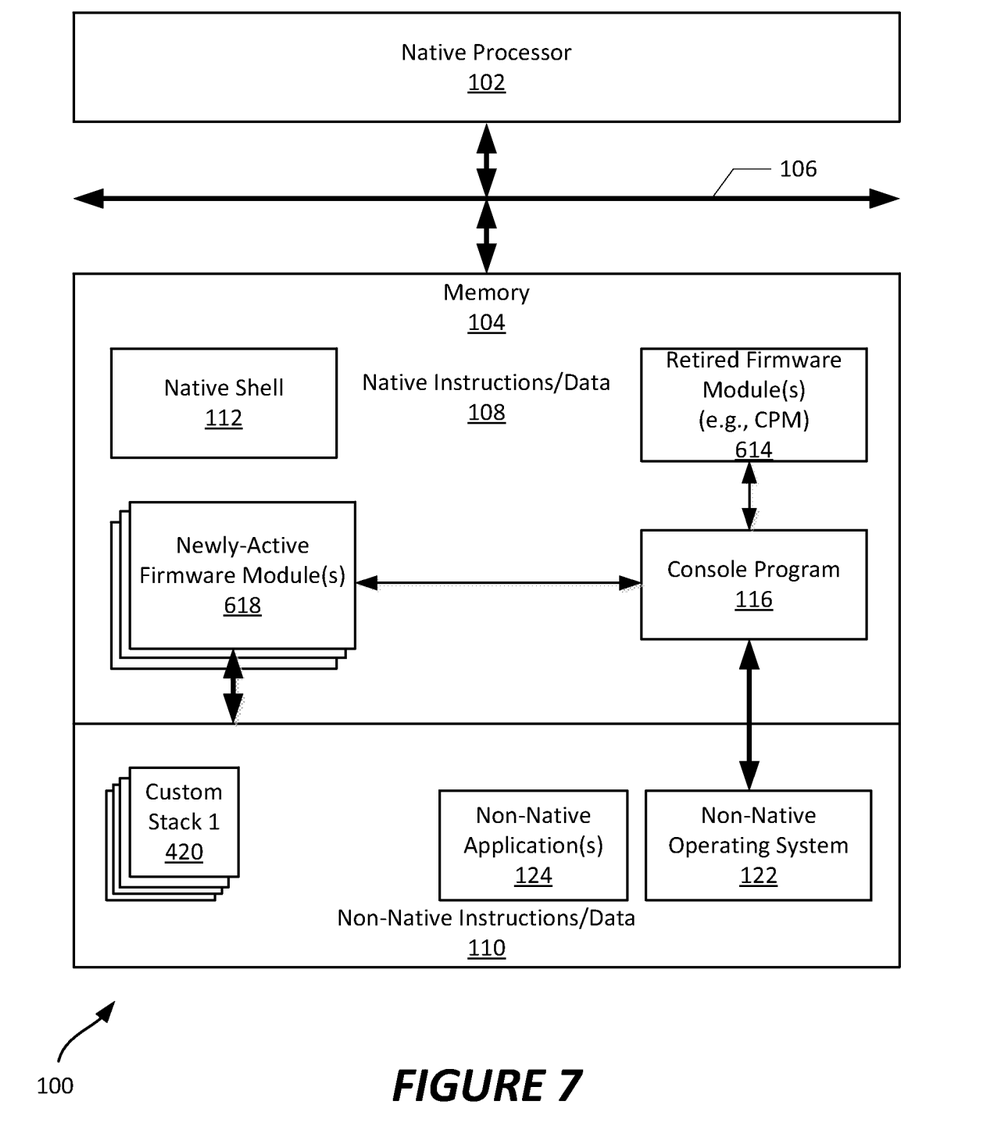
FIG. 7 is a logical block diagram of the computing system of FIG. 1 following the state of FIG. 6 during operation of the methods of FIGS. 2-3 to perform a dynamic firmware update, according to a possible embodiment of the present disclosure.

FIG. 7 is a logical block diagram of the computing system 100 of FIG. 1, in which a dynamic firmware update proceeds through completion of the method 200 disclosed in FIGS. 2-3. As illustrated in FIG. 7, additional instantiations of the updated firmware 618 can be spooled up, and operation of the partition including the updated firmware 618 is resumed, to allow resumption of execution of workloads using the central processing modules embodied in this variant of the updated firmware 618. As such, following the state illustrated in FIG. 7, this arrangement can be considered equivalent to the arrangement of FIG. 1, in which the newly updated firmware 618 can be considered the currently executing firmware 114 relative to subsequent firmware updates that become available to computing system 100.

Figure 8:
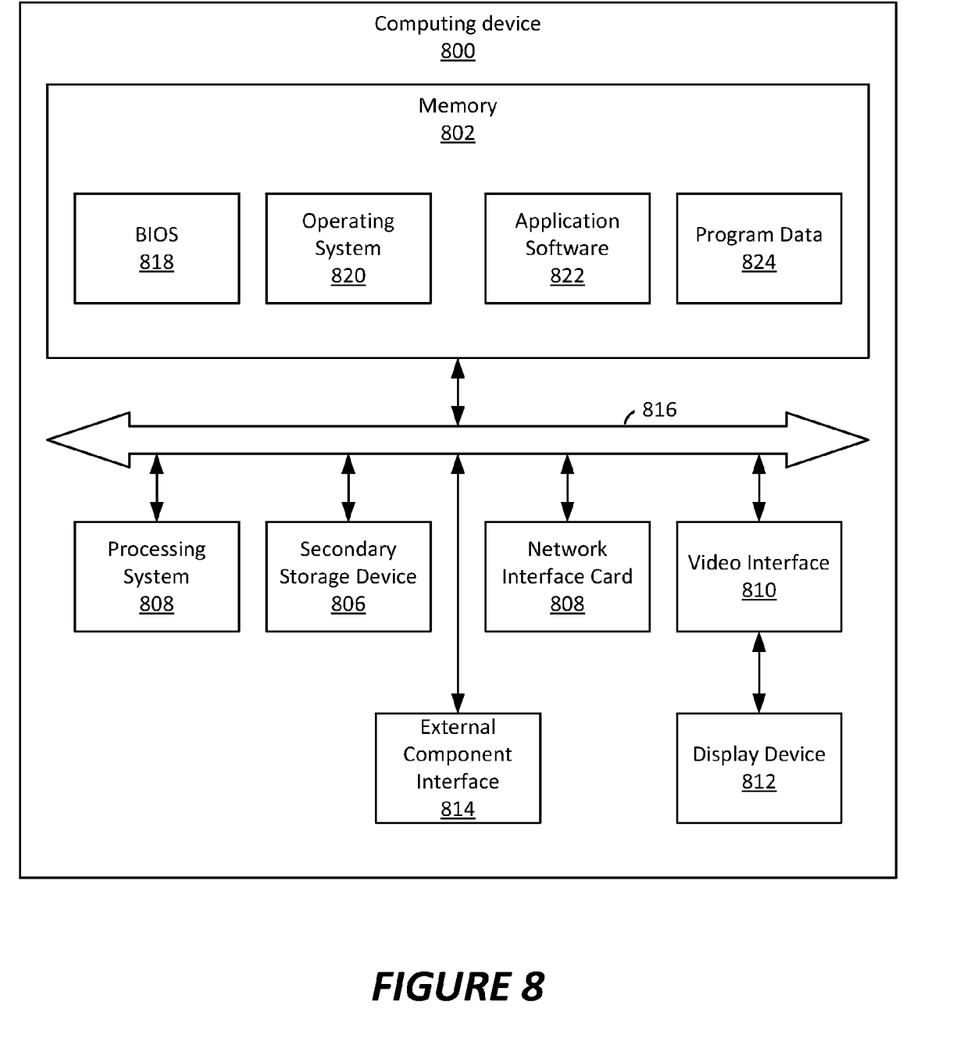
FIG. 8 is a schematic illustration of an example computing system in which aspects of the present disclosure can be implemented.

Referring now to FIG. 8, a schematic illustration of an example computing system in which aspects of the present disclosure can be implemented. The computing system 800 can represent, for example, a native computing system within which one or more of computing system 100 could be implemented. In particular, in various embodiments, the computing device 800 implements one particular instruction set architecture, and includes one or more subsystems containing firmware capable of realtime updating, as discussed herein.

In the example of FIG. 8, the computing device 800 includes a memory 802, a processing system 804, a secondary storage device 806, a network interface card 808, a video interface 810, a display unit 812, an external component interface 814, and a communication medium 816. The memory 802 includes one or more computer storage media capable of storing data and/or instructions. In different embodiments, the memory 802 is implemented in different ways. For example, the memory 802 can be implemented using various types of computer storage media.

The processing system 804 includes one or more processing units. A processing unit is a physical device or article of manufacture comprising one or more integrated circuits that selectively execute software instructions. In various embodiments, the processing system 804 is implemented in various ways. For example, the processing system 804 can be implemented as one or more processing cores. In another example, the processing system 804 can include one or more separate microprocessors. In yet another example embodiment, the processing system 804 can include an application-specific integrated circuit (ASIC) that provides specific functionality. In yet another example, the processing system 804 provides specific functionality by using an ASIC and by executing computer-executable instructions.

The secondary storage device 806 includes one or more computer storage media. The secondary storage device 806 stores data and software instructions not directly accessible by the processing system 804. In other words, the processing system 804 performs an I/O operation to retrieve data and/or software instructions from the secondary storage device 806. In various embodiments, the secondary storage device 806 includes various types of computer storage media. For example, the secondary storage device 806 can include one or more magnetic disks, magnetic tape drives, optical discs, solid state memory devices, and/or other types of computer storage media.

The network interface card 808 enables the computing device 800 to send data to and receive data from a communication network. In different embodiments, the network interface card 808 is implemented in different ways. For example, the network interface card 808 can be implemented as an Ethernet interface, a token-ring network interface, a fiber optic network interface, a wireless network interface (e.g., WiFi, WiMax, etc.), or another type of network interface.

The video interface 810 enables the computing device 800 to output video information to the display unit 812. The display unit 812 can be various types of devices for displaying video information, such as a cathode-ray tube display, an LCD display panel, a plasma screen display panel, a touch-sensitive display panel, an LED screen, or a projector. The video interface 810 can communicate with the display unit 812 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 814 enables the computing device 800 to communicate with external devices. For example, the external component interface 814 can be a USB interface, a FireWire interface, a serial port interface, a parallel port interface, a PS/2 interface, and/or another type of interface that enables the computing device 800 to communicate with external devices. In various embodiments, the external component interface 814 enables the computing device 800 to communicate with various external components, such as external storage devices, input devices, speakers, modems, media player docks, other computing devices, scanners, digital cameras, and fingerprint readers.

The communications medium 816 facilitates communication among the hardware components of the computing device 800. In the example of FIG. 8, the communications medium 816 facilitates communication among the memory 802, the processing system 804, the secondary storage device 806, the network interface card 808, the video interface 810, and the external component interface 814. The communications medium 816 can be implemented in various ways. For example, the communications medium 816 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 802 stores various types of data and/or software instructions. For instance, in the example of FIG. 8, the memory 802 stores a Basic Input/Output System (BIOS) 818 and an operating system 820. The BIOS 818 includes a set of computer-executable instructions that, when executed by the processing system 804, cause the computing device 800 to boot up. The operating system 820 includes a set of computer-executable instructions that, when executed by the processing system 804, cause the computing device 800 to provide an operating system that coordinates the activities and sharing of resources of the computing device 800. Furthermore, the memory 802 stores application software 822. The application software 822 includes computer-executable instructions, that when executed by the processing system 804, cause the computing device 800 to provide one or more applications. The memory 802 also stores program data 824. The program data 824 is data used by programs that execute on the computing device 800.

Although particular features are discussed herein as included within an electronic computing device 800, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Referring now to FIGS. 1-8 generally, it is noted that, in alternative embodiments to those discussed herein, the methods and systems described herein can be used in both standard and redundant arrangements of computing systems. In both types of systems, it is possible to obtain efficiency gains, in that even in redundant computing environments, some level of computing delay is generally observed due to the requirement of restarting and/or transferring data among computing systems within that redundant environment in the event of a failover.

As further noted herein, the systems and methods of the present disclosure provide ancillary benefits as well, such as providing a capability of updating firmware and resuming operation within a time period in which communication sessions can be maintained open (e.g., due to completed update prior to time-out of such connections). In an example of an arrangement utilizing the realtime firmware updating arrangements described herein, a system executing original firmware is capable of performing 180 k PO's per second, but an updated firmware module is capable of performing 220 k PO's a second. Accordingly, using the methods and systems described herein, less downtime is required when switching to more efficient firmware modules. Further, it may be possible to avoid restarting peripheral services associated with that firmware, such as network connections.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for updating firmware executing on a computing system, the method comprising:
    building an initial stack for use by an updated firmware module;
    quiescing I/O operations occurring on the computing system;
    suspending execution of a workload on all but a remaining firmware module from among one or more firmware modules to be updated and that are executing on the computing system;
    with the remaining firmware module executing on the computing system, indicating to perform a firmware update;
    halting execution of a partition including the remaining firmware module, the partition referenced in the initial stack and associated with memory maintained for use by both the one or more firmware modules and the updated firmware module;
    updating the remaining firmware module executing on the computing system with the updated firmware module; and
    initiating execution of the updated firmware module using the initial stack.

2. The method of claim 1, wherein the current firmware and the updated firmware comprise central processing modules.

3. The method of claim 1, further comprising, prior to building the initial stack, determining the existence of an updated firmware module available for operation on a computing system.

4. The method of claim 3, wherein determining the existence of updated firmware available for operation on the computing system occurs in a system console.

5. The method of claim 1, wherein the initial stack includes instructions to terminate stacks associated with the one or more firmware modules to be updated.

6. The method of claim 1, further comprising, after initiating execution of the updated firmware module using the initial stack:
    building a second initial stack for use by a second updated firmware module;
    initiating execution of the second updated firmware module on the second initial stack.

7. The method of claim 1, wherein, during operation, the one or more firmware modules each execute a workload on the computing system.

8. The method of claim 7, further comprising, after initiating execution of the updated firmware module, resuming execution of the workload using the updated firmware module.

9. The method of claim 1, wherein the memory associated with the partition stores instructions and data incapable of native execution on the computing system.

10. The method of claim 9, wherein the memory associated with the partition stores E-mode code.

11. The method of claim 1, wherein the computing system operates using an x86-based instruction set architecture.

12. The method of claim 1, wherein updating the remaining firmware module with the updated firmware module comprises renaming one or both of the remaining firmware module and the updated firmware module.

13. The method of claim 12, wherein updating the remaining firmware module with the updated firmware module is performed by a console program.

14. The method of claim 1, whereby the computing system is not restarted when the remaining firmware module is switched with the updated firmware module.

15. The method of claim 1, wherein one or more network connections to the computing system are maintained.

16. The method of claim 1, wherein initiating execution of the updated firmware module results in the updated firmware module executing instructions stored in the memory associated with the partition.

17. A computing system comprising:
    a memory;
    an initial firmware module associated with a partition of the computing system, the initial firmware module configured to parse and execute non-native code stored in the memory of the computing system natively on the computing system, thereby performing one or more workloads;
    a console program communicatively connected to the initial firmware module by a communication link, the console program having available an updated firmware module; and
    a non-native operating system executing on the computing system via the initial firmware module, the non-native operating system including instructions configured to query the console program to determine availability of the updated firmware module and build an initial stack for use by the updated firmware module;
    wherein the console program is configured to, upon request, update the initial firmware module with the updated firmware module, whereby the updated firmware module initiates execution from the initial stack, execution of the initial firmware module is terminated, and execution of the one or more workloads is resumed on the updated firmware module.

18. The computing system of claim 17, wherein the initial firmware module and the updated firmware module comprise central processing modules.

19. The computing system of claim 17, wherein the console program is further configured to determine whether one or more prerequisites are satisfied prior to switching the initial firmware module with the updated firmware module.

20. The computing system of claim 17, wherein the non-native operating system is further configured to quiesce one or more I/O operations of the computing system prior to notifying the console program to switch the initial firmware module with the updated firmware module.

21. The computing system of claim 17, wherein memory contents of the partition remain intact, thereby allowing the updated firmware module to resume performance of the one or more workloads previously performed by the initial firmware module.

22. A method for updating one or more central processing modules executing on a computing system, the method comprising:
- determining the existence of an updated central processing module available for operation on a computing system executing one or more initial central processing modules, each of the initial central processing modules and the updated central processing module configured to parse and execute non-native code stored in a memory of the computing system natively on the computing system;
- building an initial stack for use by the updated central processing module;
- quiescing I/O operations occurring on the computing system;
- halting all but a remaining central processing module from among the one or more central processing modules that are executing on the computing system;
- with the remaining central processing module executing on the computing system, indicating to a console program to perform an update;
- halting execution of the remaining central processing module while maintaining the non-native code in the memory for use by both the one or more central processing modules and the updated central processing module;
- switching the remaining central processing module executing on the computing system with the updated central processing module;
- initiating execution of the updated central processing module using the initial stack; and
- resuming execution of the workload using the updated firmware module;
- wherein the computing system is not required to be rebooted during updating of the central processing modules.

* * * * *